United States Patent [19]

Abe

[11] 4,437,336

[45] Mar. 20, 1984

[54] DEVICE OF INTEGRATING A SMALL AMOUNT OF FLOW OF FLUID FOR LEAK DETECTION

[75] Inventor: Takeshi Abe, Yokohama, Japan

[73] Assignee: Ricoh Co. Ltd., Japan

[21] Appl. No.: 208,318

[22] Filed: Nov. 19, 1980

[30] Foreign Application Priority Data

Nov. 20, 1979 [JP] Japan ................................. 54-150456
Aug. 14, 1980 [JP] Japan ................................. 55-111991

[51] Int. Cl.³ ........................ G01M 3/28; G08B 21/00
[52] U.S. Cl. .................................. 73/40.5 R; 340/605
[58] Field of Search ...................... 324/120, 111, 99 D, 324/51; 340/605; 73/40.5 R; 364/507

[56] References Cited

U.S. PATENT DOCUMENTS

| | | | |
|---|---|---|---|
| 2,710,397 | 6/1955 | Foster | 324/99 D |
| 3,064,193 | 11/1962 | Grubb et al. | 324/120 |
| 3,987,662 | 10/1976 | Hara et al. | 73/40.5 R |
| 4,090,179 | 5/1978 | Hirano | 340/605 |

Primary Examiner—Ernest F. Karlsen
Attorney, Agent, or Firm—McGlew and Tuttle

[57] ABSTRACT

A leak detection device for integrating a small amount of flow of fluid having a measuring unit capable of generating a series of pulses, a space between the pulses being varied in inverse proportion to the measured flow rate of fluid, a timer arranged to generate periodic timing signals for a deciding unit time interval for taking a measurement, a first integrating unit, a leakage decision unit and a second integrating unit. The first integrating unit is connected to receive and count the series of pulses from the flow measuring unit and to be reset by the respective timing signals from the timer. The leakage decision unit compares the corresponding value of the measured flow rate from the first integrating unit with a predetermined reference value, and the second integrating unit is connected for integrating the corresponding value of the measured flow rate from the first integrating unit in response to the leakage detection signals.

4 Claims, 3 Drawing Figures

DEVICE OF INTEGRATING A SMALL AMOUNT OF FLOW OF FLUID FOR LEAK DETECTION

BACKGROUND OF THE INVENTION

This invention relates to an integrating meter for measuring an amount of water used.

The present invention will be hereinafter explained in conjunction with a water supply meter to simplify the explanation thereof. The latest water supply meter has high measurement accuracy and is capable of accurately measuring the rate of flow on the order of 20 liters per hour (l/h), for example. The rate of flow on the order of 20 l/h corresponds nearly to the rate of flow in such a degree that a water pillar is separated into drips of water and drops at a place about 30 cm below a water plug, and the integrated volume of leakage of water over a month amounts to 14.4 m$^3$ (20(l)×24(h)×30(day)=14,400 l).

On the contrary, the actual condition concerning the use of water supply in general households is estimated to be about two hours per day in view of the average value of one week. Thus, the total volume of water for one month, which is not measurable by means of the water supply meter, becomes as follows, $$20(l) \times 2(h) \times 30(day) = 1,200 l = 1.2 \, m^3$$

This volume is less than one-tenth the integrated volume of leakage of water mentioned above, so that the leakage during service is of no consequence.

Taking these facts into consideration, the improvement in measurement accuracy of the water supply meter is of course important, but the leakage must also be considered in addition thereto.

SUMMARY OF THE INVENTION

It is therefore an object of the present invention to provide an integrating meter capable of monitoring the quantity consumed or time when the quantity consumed in a given time interval is less than a predetermined amount and displaying the leakage of water.

BRIEF DESCRIPTION OF THE DRAWINGS

The novel features of the subject invention, as well as the invention itself, and the obJects and advantages thereof will be better understood from the accompanying description taken in conjunction with the annexed drawings in which.

DESCRIPTION OF THE PREFERRED EMBODIMENTS

Figure 1:
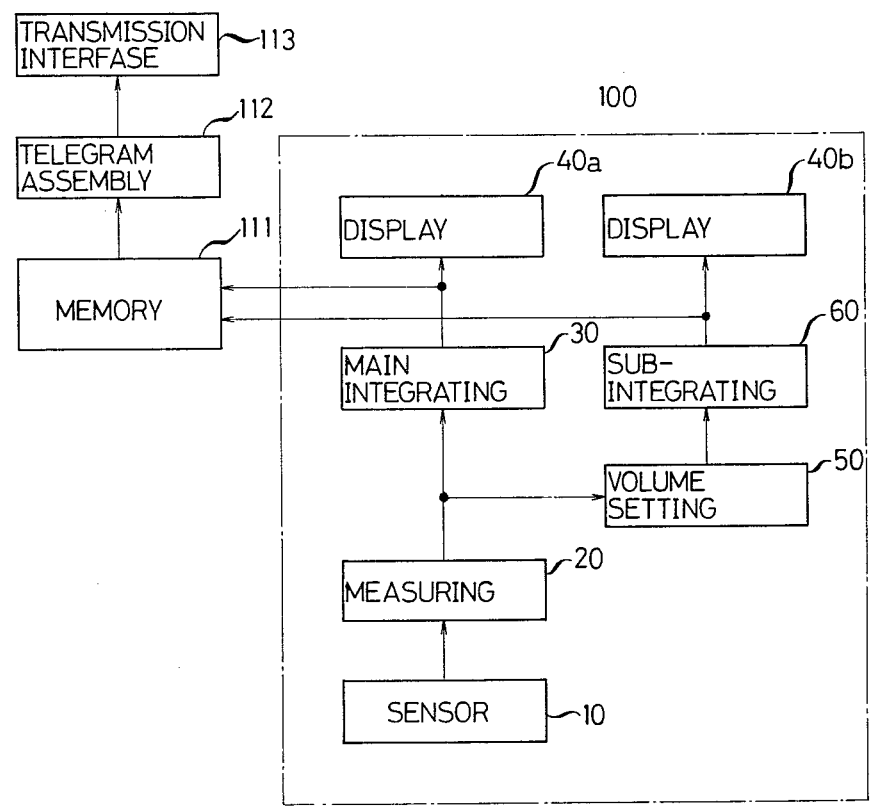
FIG. 1 shows a block diagram of one of the preferred embodiments of an integrating meter in accordance with the present invention.

To begin with, one of the embodiments of the water supply meter in accordance with the present invention will be outlined by reference to FIG. 1. In the drawing, reference numeral 10 is a sensor used for sensing the number of revolutions of an impeller which rotates in proportion to the amount of water used, 20 is a measuring unit, 30 is a main integrating unit, and 40a is a display unit. An arrangement constituted by these units 10, 20, 30 and 40a is just similar to a conventional water supply meter and functions to integrate and display the amount of water used. A new water supply meter 100 of this invention is constructed by adding a volume setting unit 50, a sub-integrating unit 60 and a display unit 40b to the constituent elements of the conventional water supply meter as described above. The volume setting unit 50 is used to monitor the condition of whether the rate of flow within a given unit time is less than a predetermined amount and actuate the sub-integrating unit 60 only when the flow rate does not exceed the predetermined amount. The sub-integrating unit 60 integrates the quantity consumed or time for that condition and indicates its results, that is, the integrated quantity consumed or integrated time on the display unit 40b. Although it is explained in the above description that the sub-integrating unit 60 continues to integrate the flow rate or time in the case where the quantity consumed in the given time interval does not reach the predetermined value, it is more preferable that it can be reset periodically or every month automatically or manually. Alternately, the sub-integrating unit 60 may be provided with a flag to be raised at a time when the integrated amount reaches the predetermined value, or may be so constructed that the latest data for a specified period can always be monitored by inputting newly-obtained data on the quantity consumed or time into the unit 60 and thereby expelling the old data therefrom. In addition, the display unit 40b can be omitted if the display unit 40a which is used commonly for the integrating units 30 and 60 by employing a change-over switch therebetween.

The up-to-date water supply meter is so constructed that the inspection of a meter can be made remotely or is possible at distant places, and a memory unit 111, a telegram assembly unit 112 and a transmission interface 113 are provided for that purpose. Accordingly, with the system as illustrated in FIG. 1, the integrated values obtained at the integrating units 30 and 60 can be transmitted to any distant places through the transmission interface 113 and monitored remotely.

As clearly understood from the foregoing, according to the present invention, the leakage of water in each household can be monitored with a very simple configuration.

Figure 2:
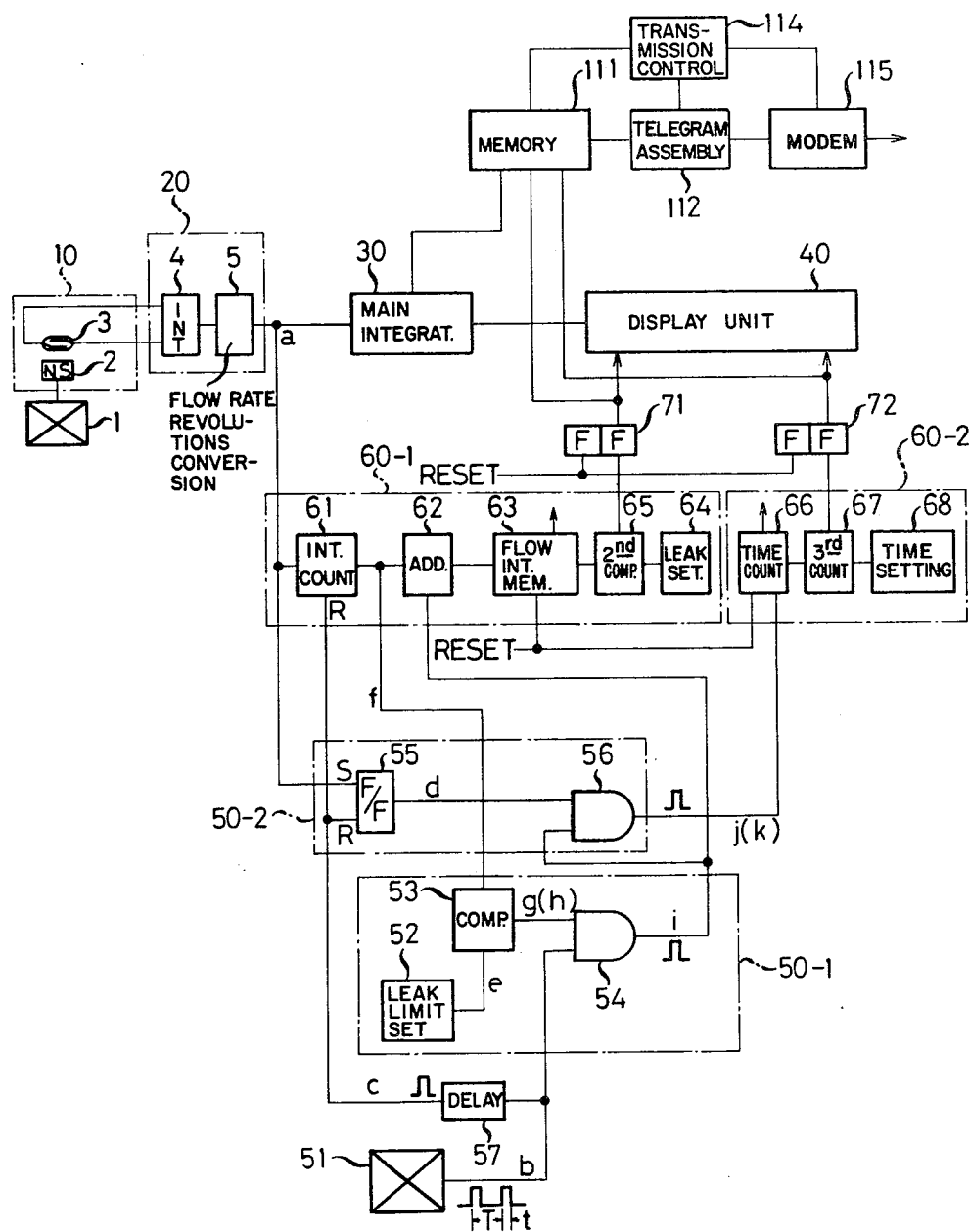
FIG. 2 shows an electrical circuit for the integrating meter illustrated in FIG. 1.
Figure 3:
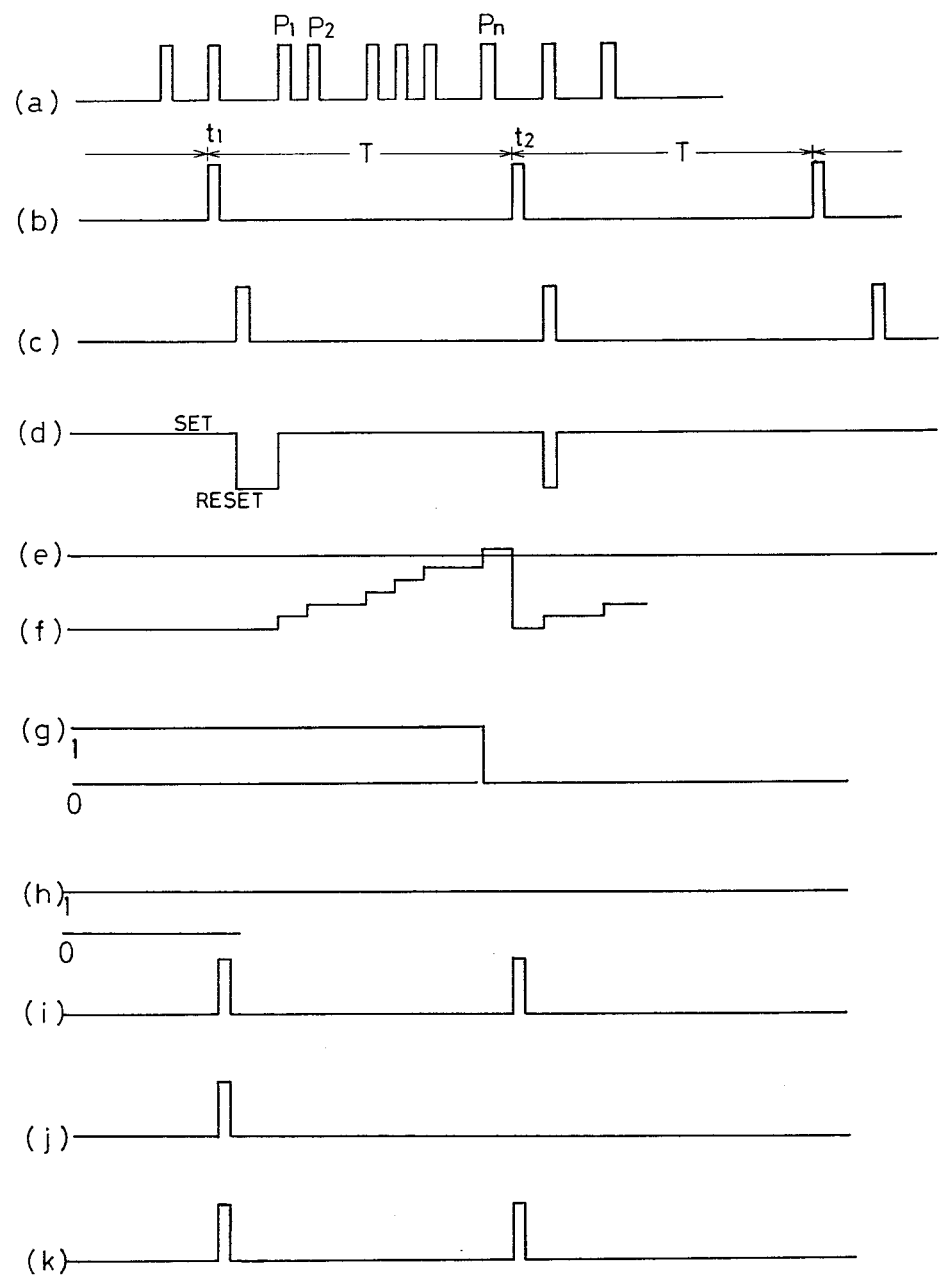
FIG. 3 shows a time chart useful for explaining the operation of the circuit indicated in FIG. 2.

The specific embodiment according to this invention, schematically illustrated in FIG. 1, will now be explained in more detail by reference to the electrical circuit of FIG. 2. The sensor 10 is composed of an impeller 1 which rotates in proportion to the amount of water used, a permanent magnet 2 revolving integrally with the impeller 1, and a magnetic sensor 3 including a reed switch and the like which is turned on and off in response to the position of rotation of the permanent magnet 2. The measuring unit 20 comprises an interface portion 4 and a flow rate-revolutions conversion circuit 5. It will be noted that the main integrating unit 30 includes a counter and that the display unit 40 is used as a common display for the display units 40a and 40b in FIG. 1. The flow rate-revolution conversion circuit 5 generates an output signal whose pulse repetition frequency varies with the measured amount of flow, as illustrated in FIG. 3a, and these pulses are applied to and counted at the integrating counter 30. An arrangement constituted by the impeller 1 through the display unit 40 is just similar to the conventional water supply meter in its construction and functions to integrate and indicate the amount of water used.

In this specific embodiment, a volume setting unit 50 includes a timer 51 which produces unit time intervals for enabling cyclic measurements for the leakage of water, a leakage decision circuit 50-1 which judges the condition of whether the rate of flow in the given time interval is below the predetermined amount and provides an enable pulse when it is less than the amount, and a leak period designation circuit 50-2 which allows the passage of the output signals from the leakage decision circuit 50-1 provided that the rate of flow is not at zero. The sub-integrating unit 60 includes an integrated flow rate decision circuit 60-1 and an integrated time decision circuit 60-2. The integrated flow rate decision circuit 60-1 and the integrated time decision circuit 60-2 are provided with an integrating counter 61 which counts up the pulses from the measuring unit 20 and a time counter 66 which integrates the elapsed time for leak, respectively.

In the volume setting unit 50, the timer 51 outputs pulse signals $t_1$, $t_2$ . . . having a constant period T as shown in FIG. 3b and the output of the timer 51 is connected to one of input terminals of an AND gate 54. The leakage decision circuit 50-1 has a comparator 53 which compares the integrated value of the integrating counter 61 in the integrated flow rate decision circuit 60-1 with a set point in a leakage limit setting circuit 52. The output terminal of the comparator 53 is connected to the other input of the AND gate 54. The comparator 53 is always at high at its output side and retains its condition so long as the integrated value from the integrating counter 61 is less than the set point in the leakage limit setting circuit 52. Thus, the pulse signals from the timer 51 appear at the output side of the AND gate 54 when the rate of flow is below the set point.

The leak period designation circuit 50-2 comprises a flip-flop 55 set by the pulse from the flow rate-revolutions conversion circuit 5 in the measuring unit 20, and an AND gate 56 having two inputs corresponding to the set output signal from the flip-flop 55 and the output pulse signal from the leakage decision circuit 50-1 . Thus, the output pulse signals from the circuit 50-1 appear at the output side of the AND gate 56 only when the flip-flop 55 is placed under its set condition. This means that the pulses from the timer 51 are passed through the AND gate 56 as leak time pulses when the measured flow rate is below the set point, but not zero.

The pulse output signals of the flow rate-revolution conversion circuit 5, which are proportional to the rate of flow as shown in FIG. 3a, are counted at the integrating counter 30 and also applied to the integrating counter 61 and the flip-flop circuit 55. Assuming now that the counter 51 generates the pulse signal $t_1$, this pulse $t_1$ is directly applied to the one input terminal in the AND gate 54, and also applied to the reset terminals of the integrating counter 61 as well as the flip-flop 55 after having been delayed by a predetermined time through a delay circuit 57 (Refer to FIG. 3c) to reset them. However, if the pulse output signal from the conversion circuit 5 was not present during the previous period T, the flip-flop 55 is held at its reset condition, so that the flip-flop 55 maintains its reset condition regardless of the application of the reset pulse thereto.

Under these conditions, the pulse output signals $P_1$, $P_2$ ... $P_n$ from the flow rate-revolutions conversion circuit 5 are counted by the integrating counter 61, and the counted value in the counter 61 (Refer to FIG. 3f) are compared with the set point (Refer to FIG. 3e) in the leakage limit setting circuit 52, at the comparator 53.

When the counted value exceeds the set point, the output of the comparator is changed from "1" to "0" to close the AND gate 54 (Refer to FIG. 3g). In other words, in case that the integrated value in the integrating counter 61 does not exceed the set point in the circuit 52 or the rate of flow is less than the predetermined amount, the output of the comparator 53 remains at "1" as shown in FIG. 3h to maintain the AND gate 54 open.

Subsequently, if the timer 51 generates the next pulse $t_2$, the counter 61 and the flip-flop 55 are reset as mentioned before. At this juncture, if the AND gate 54 is open, that is, the integrated value of the integrating counter 61 during the measurement period T does not reach the set point in the circuit 52, the pulse signal (Refer to FIG. 3i) corresponding to the output $t_2$ of the timer 51 appears at the output side of the AND gate 54. An adder 62 connected to the integrating counter 61 is operated by this pulse, and the integrated value of the counter 61 is memorized into a flow rate integrating memory 63 in additive form. Whereas, if the AND gate 54 is closed upon the occurrence of the pulse $t_2$ or when the integrated value in the counter 61 is larger than the set point, the adder 62 will not be operated. Accordingly, the flow rate integrating memory 63 memorizes in additive form only the integrated values obtained at the time when the rate of flow is less than the value set in the leakage limit setting circuit 52.

The value in the flow rate integrating memory 63 is compared with a set point for anticipated leak set in a leakage setting circuit 64 in advance, at a second comparator 65. The set point for anticipted leak is optional and corresponds to an integrated flow rate for leakage over a month, week or day to be monitored periodically. The second comparator 65 actuates a flip-flop 71 when the value in the flow rate integrating memory 63 exceeds the set point, and the output of the flip-flop 71 is applied to the display unit 40 and the memory 111.

As mentioned before, the measured rate of flow during the fixed period T is less than the predetermined amount, namely, when the AND gate 54 is opened, the AND gate 56 is opened provided that the flow rate-revolutions conversion circuit 5 generates at least one output pulse, or the measured rate of flow is not zero during the period T. In other words, when the measured rate of flow during the fixed period T is less than the predetermined amount and is not zero, the AND gate 56 is opened. Under these conditions, the output pulses from the timer 51 are supplied through the AND gates 54 and 56 to a time counter 66 in the integrated time decision circuit 60-2 and counted integrally by the counter 66 (Refer to FIG. 3k). On the other hand, since the AND gate 54 is closed when the measured rate of flow during the period T exceeds the set point and the AND gate 56 is closed when the rate of flow is zero, the output pulses from the timer 51 are not provided to the time counter 66. Like these, the time counter 66 counts integrally only the time interval when the rate of flow is below the set point, but not zero.

The integrated value in the time counter 66 is compared with a set point for anticipated time interval set in a time setting circuit 68, at a third comparator 67. The set point for anticipated time interval is related to the set point for anticipated leak and corresponds to an anticipated non-use total time over a month, week or day. The comparator 67 actuates a flip-flop 72 when the integrated time exceeds the set point, and the output of the flip-flop 72 is applied to the display unit 40 and the memory 111.

All the output data from the main integrating counter 30, comparators 65 and 67 stored in the memory 111 are transmitted at the distant places through the telegram assembly circuit 112, transmission control circuit 114 and modem 115, when required.

While there has been described and illustrated what is at present considered to be the preferred embodiments of the present invention, it will be appreciated that the present invention is not restricted by the embodiment illustrated and that numerous changes and modifications are likely to occur to those skilled in the art. For example, it will be possible that a programmable counter is used instead of the timer 51, the outputs of the flow rate integrating memory 63 and the time counter 66 are directly displayed as indicated by arrows in FIG. 2 or transmitted to other places as mentioned above, and the flow rate integrating memory 63, time counter 66, flip-flops 71 and 72 can be reset manually or automatically.

As clearly understood from the foregoing, according to the principles of the present invention, the leakage of water in each household, which is less than the predetermined amount but not zero, can be monitored with high reliabilities.

What is claimed is:

1. A device for integrating a small amount of flow of fluid comprising:
   (a) flow measuring means capable of generating a series of pulses, a space between the pulses being varied in inverse proportion to the measured flow rate of fluid;
   (b) a timer (51) arranged to generate periodic timing signals for a deciding unit time interval for taking a measurement;
   (c) first integrating means (61) connected to receive and count the series of pulses from said flow measuring means and to be reset by the respective timing signals from said timer, said first integration means producing corresponding values of the measured flow rate to which the counted number of pulses per unit time interval pertains;
   (d) a leakage decision unit (50-1) for comparing the corresponding value of the measured flow rate from said first integrating means with a predetermined reference value corresponding to a normal lower limit for the rate of flow usually consumed and providing a leakage detection signal at a time when the corresponding value of the measured flow rate is less than the reference value; and
   (e) second integrating means (62, 63) for integrating the corresponding value of the measured flow rate from said first integrating means in response to the leakage detection signals from said leakage decision unit.

2. A device as set forth in claim 1, further comprising a comparator for comparing the integrated value in said first integrating means with a predetermined value corresponding to a total amount of leakage for a predetermined duration and generating a warning signal at a time when the integrated value exceeds the predetermined value.

3. A device as set forth in claim 1, further comprising a leak period designation unit (50-2) which allows the passage of timing signals from said timer when the leakage detecting signal is produced by said leakage decision unit and the count of said first integrating means is not zero, and a time counter (66) for counting the timing signals from said leak period designation unit.

4. A device as set forth in claim 3, further comprising a further comparator (67) for comparing the count of said time counter with the reference value corresponding to a predetermined leak period and producing an output at a time when the count exceeds the reference value.

* * * * *